(12) United States Patent
Zabetian

(10) Patent No.: US 11,960,788 B2
(45) Date of Patent: Apr. 16, 2024

(54) SYSTEMS AND METHODS FOR CHANGING LANGUAGE DURING LIVE PRESENTATION

(71) Applicant: KUDO, INC., New York, NY (US)

(72) Inventor: Fardad Zabetian, New York, NY (US)

(73) Assignee: KUDO, INC., New York, NY (US)

( * ) Notice: Subject to any disclaimer, the term of this patent is extended or adjusted under 35 U.S.C. 154(b) by 317 days.

(21) Appl. No.: 16/106,964

(22) Filed: Aug. 21, 2018

(65) Prior Publication Data

US 2019/0056908 A1 Feb. 21, 2019

Related U.S. Application Data

(60) Provisional application No. 62/548,282, filed on Aug. 21, 2017.

(51) Int. Cl.
*G06F 3/16* (2006.01)
*G06F 3/0482* (2013.01)
*G06F 3/0484* (2022.01)

(52) U.S. Cl.
CPC ............ *G06F 3/167* (2013.01); *G06F 3/0482* (2013.01); *G06F 3/0484* (2013.01)

(58) Field of Classification Search
CPC ........ G06F 40/40; G06F 17/289; G06F 40/00; G06F 16/3337; G06F 3/0482; G06F 3/167; G06F 3/0484; H04M 2242/12; H04M 2250/58
See application file for complete search history.

(56) References Cited

U.S. PATENT DOCUMENTS

| | | | |
|---|---|---|---|
| 2006/0165225 A1* | 7/2006 | Sahashi | H04M 3/51 379/67.1 |
| 2007/0016401 A1* | 1/2007 | Ehsani | G06F 40/55 704/9 |
| 2010/0135478 A1 | 6/2010 | Wald et al. | |
| 2011/0106873 A1 | 5/2011 | D'Penha et al. | |

(Continued)

OTHER PUBLICATIONS

Notification of Transmittal of the International Search Report and the Written Opinion of the International Searching Authority, dated Nov. 7, 2018, issued in corresponding International Application No. PCT/US2018/047174, 7 pages.

*Primary Examiner* — Daniel Samwel
*Assistant Examiner* — David Tan
(74) *Attorney, Agent, or Firm* — FOLEY & LARDNER LLP

(57) ABSTRACT

Disclosed herein are embodiments of systems, methods, and products comprising an analytic server, which receives a request from a user to participate in a panel or an event in a selected language. The analytic server may determine and select the interpreter for the user to provide real time interpretation services. The analytic server transmits the audio signals in the source language interpreter electronic device. After the interpreter translates the audio signals in source language to the selected target language, the analytic server receives the translated audio signals from the interpreter electronic device. The analytic server then transmits the translated audio signals in the user requested language to the user electronic device. When the user changes to a different target language, the analytic server selects a different interpreter to provide real time translation, and transmits the translated audio signals in a new target language to the user.

18 Claims, 6 Drawing Sheets

(56) References Cited

U.S. PATENT DOCUMENTS

| | | | |
|---|---|---|---|
| 2014/0132701 A1* | 5/2014 | Wang | H04L 12/1827 |
| | | | 348/14.08 |
| 2014/0156254 A1* | 6/2014 | Frankel | G10L 15/005 |
| | | | 704/2 |
| 2015/0237488 A1 | 8/2015 | Howerton | |
| 2015/0339790 A1* | 11/2015 | Robinson | G09B 21/006 |
| | | | 704/2 |
| 2018/0322116 A1* | 11/2018 | Huang | G06F 3/04883 |

* cited by examiner

SYSTEMS AND METHODS FOR CHANGING LANGUAGE DURING LIVE PRESENTATION

CROSS REFERENCES TO RELATED APPLICATIONS

This application claims priority to U.S. Provisional Application Ser. No. 62/548,282, filed Aug. 21, 2017, which is hereby incorporated by reference in its entirety.

TECHNICAL FIELD

This application relates generally to methods and systems for language translation during live presentation on a mobile electronic device using a language interpretation service.

BACKGROUND

Interpretation services may have the potential to revolutionize the way people around the world who do not speak a common language communicate with one another. Such service may be essential for international panels and conferences. For example, the United Nations interpretation service may be a part of a conference interpreting system. Its core function is to provide interpretation from and into different languages for meetings held at the United Nations. Interpretation may be necessary to the participants for proper conduct and smooth functioning of their deliberations.

The conference interpreting system may convert a thought or expression in a source language into an expression with a comparable meaning in a target language. In existing and conventional methods, the interpreting system may have some hardware or equipment requirements. For example, in the majority of United Nations meetings, the interpreters are confined in glass-encased booths aided with earpieces and microphones. In the ideal setting for oral language, the interpreters may sit in a soundproof booth and speak into a microphone while hearing the source language speaker via earpieces. The listeners may wear earpieces to listen to the rendered target language. These conventional methods and solutions may require the interpreter and the participants to sit or stand in close proximity to one another. As a result, only a certain number of interpreters can be accommodated, unless portable electronic equipment is used. The requirement of certain hardware or equipment may pose another limitation on the conventional methods. For example, the interpreters and the listeners may need to have earpieces, microphones, and other communication hardware components. In addition, the participants/listeners may need to adjust the hardware to a specific channel to receive a target language that is suitable to the listeners, and it may not be convenient or easy for a listener to change a channel during a live presentation. The hardware requirements, settings, and adjustments may make the interpretation service inconvenient and impractical for use by a multi-lingual audience. In other conventional methods for online content interpretation, the user may need to restart the presentation to replay it when the user selects a different language during the presentation.

Furthermore, there may be thousands of different languages spoken in the world, however, the hardware in conventional methods may not be able to include thousands of different channels due to technical challenges. Thus, it may be difficult for the conventional methods to provide interpretation service for a live presentation to people around the world that may speak many different languages.

SUMMARY

For the aforementioned reasons, there is a need for an efficient system that allows a user to more easily change a translation language to another language during live presentation on a mobile device using an interpretation service. Discussed herein are systems and methods for receiving a request to select or change a language, determining an interpreter based on the presentation source language and the requested target language, transmitting the presentation audio to the interpreter that translates the audio into the requested language, transmitting the audio in the requested language to the user.

In one embodiment, a method may include receiving, by a server, audio signals data associated with a live presentation from a first electronic device associated with one or more panelists, wherein a language of content corresponding to the audio signals data is in a source language. The method may further include receiving, by the server, a request from a second electronic device associated with a user, wherein the request comprises a first target language selected by the user through a first graphical user interface. The method may further include selecting, by the server, a first interpreter based on the source language and the target language, wherein the server displays a second graphical user interface on a third electronic device associated with the first interpreter requesting the first interpreter to input an incoming language and an outgoing language, and wherein the server selects the first interpreter in response to the incoming language matching the source language and the outgoing language matching the first target language. The method may further include transmitting, by the server, the audio signals data to the third electronic device, wherein the first interpreter translates the audio signals data from the source language to the first target language on the third electronic device in real time. The method may further include receiving, by the server, the audio signals data in the first target language from the third electronic device. The method may further include transmitting, by the server, the audio signals data in the first target language to the second electronic device associated with the user. When the user selects a second target language during the live presentation, the method may further include selecting, by the server, a second interpreter based on the source language and the second target language, wherein the server displays a third graphical user interface on a fourth electronic device associated with the second interpreter requesting the second interpreter to input the incoming language and the outgoing language, wherein the server selects the second interpreter in response to the incoming language matching the source language and the outgoing language matching the second target language, and wherein the second interpreter translates the audio signals data from the source language to the second target language in real time. The method may further include transmitting, by the server, the audio signals data in the second target language to the second electronic device associated with the user.

In another embodiment, a system may include a first electronic device being operated by one or more panelists, a second electronic device being operated by a user, and a server connected to the first electronic device and the second electronic device via one or more networks. The server is configured to receive audio signals data associated with a live presentation from the first electronic device, wherein a language of content corresponding to the audio signals data is in a source language; receive a request from the second electronic device, wherein the request comprises a first target language selected by the user through a first graphical user interface; select a first interpreter based on the source language and the target language, wherein the server displays a second graphical user interface on a third electronic device associated with the first interpreter requesting the first interpreter to input an incoming language and an outgoing language, and wherein the server selects the first interpreter in response to the incoming language matching the source language and the outgoing language matching the first target language; transmit the audio signals data to the third electronic device, wherein the first interpreter translates the audio signals data from the source language to the first target language on the third electronic device in real time; receive the audio signals data in the first target language from the third electronic device; transmit the audio signals data in the first target language to the second electronic device associated with the user; when the user selects a second target language during the live presentation, select a second interpreter based on the source language and the second target language, wherein the server displays a third graphical user interface on a fourth electronic device associated with the second interpreter requesting the second interpreter to input the incoming language and the outgoing language, wherein the server selects the second interpreter in response to the incoming language matching the source language and the outgoing language matching the second target language, and wherein the second interpreter translates the audio signals data from the source language to the second target language in real time; and transmit the audio signals data in the second target language to the second electronic device associated with the user.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
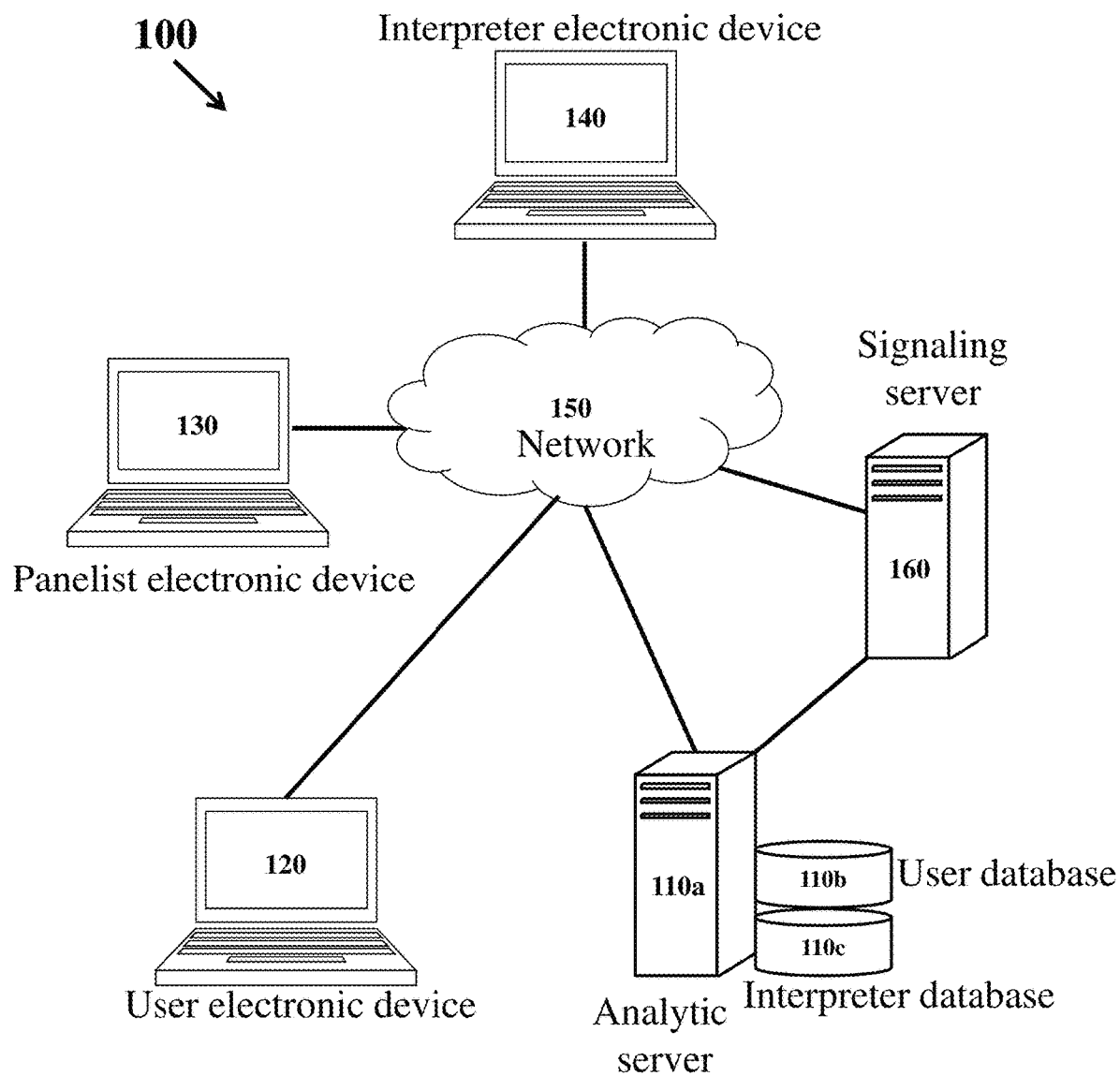
FIG. 1 shows components of an exemplary system for language translation, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Various embodiments described herein generally relate to methods and systems that provide an efficient technique for language interpretation service for a live presentation, which may be a peer-to-peer real-time communication session, on a mobile device, based on receiving a request from a user or participant of a mobile device. In some embodiments, the methods and systems described herein use mobile devices that can execute a language interpretation application that facilitates translational activity from a source language to one or more other languages during the live translation. The user or participant can command the language interpretation application running on the mobile device to initiate a request for translation of the source language in the one or more other languages via a language interpretation system that runs the language interpretation application. Although described herein the language interpretation application as taking a form of a software application on the mobile devices, it should be appreciated that some embodiments are not limited to such a form factor. For instance, in some instances, users or participants may access the language interpretation system and services via a website, where the language interpretation system may comprise a webserver in communication with an application server configured to perform the various language interpretation processes and language interpretation tasks described herein. The user or participant may access the language interpretation system through a native language interpretation application installed on the user's local mobile device that was downloaded from a server of the language interpretation system. Additionally or alternatively, the user or participant may access the language interpretation system through an Internet browser language interpretation application through which the user may provide various process instructions to a webserver of the language interpretation system. Other embodiments of the language interpretation application may include a software application executed by a mobile device through which the user interfaces with the language interpretation system via a keyboard interface on the user's mobile device. The language interpretation system may then perform the various tasks and processes described herein, based upon the keyboard-based instructions received from the user's mobile device.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein.

FIG. 1 illustrates components of an exemplary system 100 (such as a language interpretation system) for language translation during a live presentation, which may be a peer-to-peer (P2P) real-time communication session. In a peer-to-peer communication session, each node of the network can initiate a session or send a service request. During a live presentation, a computer (e.g., a panelist electronic device) may transmit directly to another computer (e.g., an interpreter electronic device or a user electronic device) without transmitting through a centralized server. The peer-to-peer communication session may transmit in real-time and may be preferred to a client/server configuration where the server transmits to each client. During the peer-to-peer communication session, a server is utilized for signaling, and each node (e.g., a panelist electronic device, an interpreter electronic device, or a user electronic device) contains metadata about other nodes with which the nodes communicate.

The exemplary system 100 may include an analytic server 110a with a user database 110b and an interpreter database 110c, a user electronic device 120, a panelist electronic device 130, and an interpreter electronic device 140. The user electronic device 120 may be connected with the analytic server 110a via hardware and software components of one or more networks 150. Further, the analytic server 110a may be connected with the panelist electronic device 130 and the interpreter electronic device 140 via the network 150. Examples of the network 150 include, but are not limited to, Local Area Network (LAN), Wireless Local Area Network (WLAN), Metropolitan Area Network (MAN), Wide Area Network (WAN), and the Internet. The network 150 may include both wired and wireless communications according to one or more standards and/or via one or more transport mediums. The communication over the network 150 may be performed in accordance with various communication protocols such as Transmission Control Protocol and Internet Protocol (TCP/IP), User Datagram Protocol (UDP), and IEEE communication protocols. In one example, the network 150 may include wireless communications according to Bluetooth specification sets, or another standard or proprietary wireless communication protocol. The network 150 may also include communications over a cellular network, including, e.g. a GSM (Global System for Mobile Communications), CDMA (Code Division Multiple Access), or EDGE (Enhanced Data for Global Evolution) network.

An analytic server 110a, a user electronic device 120, a panelist electronic device 130, and an interpreter electronic device 140 may include one or more processors to control and/or execute operations of a system 100. In some embodiments, a single processor may be employed. In some embodiments, a plurality of processors may be employed for configuring the system 100 as a multi-processor system. The processor may include suitable logic, circuitry, and interfaces that are operable to execute one or more instructions to perform data transfer and other operations. The processor may be realized through a number of processor technologies. The examples of the processor include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor. The processor may also include a Graphics Processing Unit (GPU) that executes the set of instructions to perform one or more processing operations.

A user electronic device 120 may be any computing device allowing a participant/user to interact with an analytic server 110a. The user electronic device 120 may be operated by a participant or a user, and these terms may be used interchangeably throughout this disclosure. The user electronic device 120 may communicate with the analytic server 110a through one or more networks 150, using wired and/or wireless communication capabilities. The user electronic device 120 may be any computing device comprising a processor and non-transitory machine-readable storage medium allowing the user electronic device 120 to perform the various tasks and processes described herein. The examples of the computing device may include, but are not limited to, a cellular phone, a mobile phone, a desktop computer, a laptop, a personal digital assistant (PDA), a smartphone, a tablet computer, a smart watch, and the like.

The user electronic device 120 may include one or more input/output devices configured to allow user interaction with one or more programs configured to communicate with analytic server 110a to perform language interpretation. In some embodiments, the user may have a language interpretation application installed on the user electronic device 120 from which user access and interact with the analytic server 110a to perform language interpretation. The language interpretation application may be a software stack running on an operating system (OS) of the user electronic device 120. The language interpretation application of a language interpretation system may have a protocol layer and a user interface layer ("UI") where each layer may be responsible for specific functions. The protocol layer of the language interpretation application may communicate with the OS of the user electronic device 120 and manages the connections of the user electronic device 120 over the communication network 150. The protocol layer may also communicate with the user interface layer and may be arranged to control the user interface layer to present information to the user via the user interface of the language interpretation application on the user electronic device 120 and to receive information from the user via the user interface of the language interpretation application on the user electronic device 120.

In some embodiments, a user electronic device 120 may run a web browser that accesses and presents a language interpretation web application to be executed by a processor of the user electronic device 120 or the analytic server 110a and allows the user to perform language interpretation using the language interpretation web application on the user electronic device 120. In some embodiments, the user electronic device 120 may execute an application outside of a web browser, for example, an operating system-specific language interpretation application that accesses and presents information processed by the processor of the user electronic device 120 or the analytic server 110a to perform language interpretation.

In operation, as discussed above, a user of a user electronic device 120 may execute an Internet browser or a local language interpretation application that accesses an analytic server 110a in order to issue requests or instructions for language interpretation of a source language into one or more different languages. Initially, the user may not have an account on the language interpretation application, and the user may register on the language interpretation application. The user may register on the language interpretation application installed on the user electronic device 120 by generating a username using a full name, a phone number, and/or e-mail address to access the account. If the user already has an account, then the user electronic device 120 may transmit credentials from a user interface to the analytic server 110a, from which the analytic server 110a may authenticate the user and/or determine a user role. The user electronic device 120 may comprise any number of input devices configured to receive any number of data inputs, including various types of data inputs allowing for authentication (e.g., username, passwords, certificates, and biometrics). Upon the receipt of the authentication credentials of the user by the analytic server 110a, the analytic server 110a may implement a series of security protocols in order to verify that a service account of the language interpretation application being accessed by the user on the user electronic device 120 belongs to the user. For instance, in a first layer of security protocol implemented by the analytic server 110a, the analytic server 110a may generate a security code that may be transmitted to a phone number of the user electronic device 120. The analytic server 110*a* may request a user of the user electronic device 120 to enter the code on a user interface of the language interpretation application installed on the user electronic device 120. In some embodiments, the code may be associated with an expiry time. The expiry time may be included in the code.

Upon the authentication of credentials of a user, the user may then be allowed to generate and transmit requests/instructions for language interpretation via a language interpretation application and/or a web service of the language interpretation application on a user electronic device 120. The language interpretation application may include a graphical user interface (GUI) that renders an interactive layout, schematic, or various elements for the user to input requests/instructions such as a request for a language interpretation from a source language into one or more languages during a live panel discussion and/or presentation being watched or listened to on the user electronic device 120. The live panel discussion and/or presentation streaming on any software application on the user electronic device 120 may be held in a city with different panelists speaking different languages such as English, Hindi, Spanish, and Russian during a live presentation or discussion. A user of the user electronic device 120 may initiate and execute a request to participate in the live panel discussion and/or presentation. Upon acceptance of the request of the user by an administrator device managing the live panel discussion and/or presentation, the user of the user electronic device 120 may join the live panel discussion and/or presentation. The user may realize that the user does not speak one or more of the panelists' languages (also known as source languages of panelist) being spoken in the live panel discussion and/or presentation. The user of the user electronic device 120 may then select a language (for example, Chinese language) from a plurality of languages on the language interpretation application, and then generate and execute a request for real time language interpretation service that may translate a source language (for example, Spanish language) being spoken in panelists' discussion and/or presentation into the language (for example, Chinese language) selected by the user. In some embodiments, the user interface of the user electronic device 120 may include a text-based interface allowing the user to enter manual commands for generating and executing a request for language interpretation from a source language (for example, Spanish language) into one or more languages (for example, Chinese and English language) during a live discussion and/or presentation. In some embodiments, the user interface of the user electronic device 120 may include an interface allowing the user to enter voice commands for generating and executing a request for language interpretation from a source language (for example, Spanish language) into one or more languages (for example, Chinese and English language) during a live discussion and/or presentation. In some embodiments, the user interface of the user electronic device 120 may include an interface allowing the user to enter visual commands for generating and executing a request for language interpretation from a source language (for example, Spanish language) into one or more languages (for example, Chinese and English language) during a live discussion and/or presentation.

In some embodiments, a user of a user electronic device 120 may not only listen to a live panel discussion and/or presentation on its user electronic device 120, but also participate in the live panel discussion and/or presentation by asking questions and discussing with the other panelists. For example, the user of the user electronic device 120 may type the questions into a text-based interface of the user electronic device 120 or speak to an audio supporting GUI displayed on the user electronic device 120 in any selected language (for example, Chinese language). The real time language interpretation service that may then translate the Chinese language being spoken by the user into a source language (for example, Spanish language) of the live discussion and/or presentation, and transmit user's speech to other panelists of the live discussion and/or presentation in the Spanish language.

A panelist electronic device 130 may be any computing device allowing each panelist to interact with an analytic server 110*a* and/or an user electronic device 120. The panelist electronic device 130 may be any computing device comprising a processor and non-transitory machine-readable storage medium allowing the panelist electronic device 130 to interact with the analytic server 110*a* and/or an user electronic device 120 through one or more networks 150. The examples of the computing device may include, but are not limited to, a desktop computer, a laptop, a personal digital assistant (PDA), a smartphone, a tablet computer and the like.

In a peer-to-peer communication session, the panelist operating the panelist electronic device 130 and the participant or user operating the user electronic device 120 may be considered nodes in the network. Each node may have a role such as a "panelist" or "participant" for a particular communication session, but the nodes (e.g., electronic devices) may be configured such that any node can be a panelist or participant. In other words, in some instances, an electronic device may be configured as a panelist for a communication session, but in other instances, that same electronic device may have the role of a participant. As a result, the peer-to-peer communication session can operate as a many-to-many system or as a one-to-many system. Although FIG. 1 depicts a single panelist electronic device and a single user electronic device, it is intended that the system 100 can be configured for multiple panelist electronic devices and multiple user electronic devices in a many-to-many system.

The panelist electronic device 130 may be configured to record video signals (containing audio data as well) and/or audio signals during panelists' live discussion and/or presentation, and transmit the video and/or audio signals to the analytic server 110*a* over a network 150. The recorded video and/or audio signals may be in a source language (for example, a first language) the panelists speak. After the analytic server 110*a* receives the video and/or audio signals, the analytic server 110*a* may select one or more interpreters operating one or more interpreter electronic devices 140 to translate the video and/or audio signals in a first language into one or more target languages (for example, a second language) requested by a user. In some embodiments, the panelist electronic device 130 may also receive video and/or audio signals of participants'/users' questions in a language (for example, a second language) the participants'/users' speak. For example, the participants/users may ask questions in their languages (for example, a second language) by issuing requests in the GUI displayed on their respective user electronic device 120. The analytic server 110*a* may receive such question requests and request the interpreters to translate the questions into the language (for example, a first language) the panelists speak. The analytic server 110*a* may then transmit the translated audio signals into a first language to the panelist electronic device 130. Thus, the panelists using the panelist electronic devices 130 and the users using the user electronic devices 120 may be able to communicate over the network 140 in live presentation even though they speak different languages (such as a first language and a second language), and in different locations (such as a first location of panelists and a second location of a user).

In some embodiments, recorded video and/or audio signals during a live panel discussion and/or presentation may be in multiple source languages (for example, a first language and a second language) the panelists speak. One panelist in a first location may be speaking in a first language and another panelist in a second location may be speaking a second language during the live panel discussion and/or presentation. After the analytic server 110*a* receives the video and/or audio signals in the first language and the second language, the analytic server 110*a* may select one or more interpreters operating one or more interpreter electronic devices 140 to translate the video and/or audio signals in the first language and the second language into a target language (for example, a third language) requested by a user. In some embodiments, the panelist electronic device 130 may also receive video and/or audio signals of user questions in a language (for example, a third language) the user speak. For example, the user may ask questions in their language (for example, a third language) by issuing requests in a GUI displayed on their respective user electronic device 120. The analytic server 110*a* may receive such question requests and request the interpreters to translate the questions into the language (for example, a first language and a second language) the panelists speak. The analytic server 110*a* may then transmit the translated audio signals into a first language and a second language to the panelist electronic device 130. Thus, the panelists using the panelist electronic devices 130 and the users using the user electronic devices 120 may be able to communicate over the network 140 in live presentation even though they speak different languages (such as a first language, a second language, and a third language), and in different locations (such as a first location and a second location of panelists, and a third location of a user). People around the world may be able to communicate with anyone instantly in any language through assistance of a language interpretation service.

An interpreter electronic device 140 may be any computing device allowing an interpreter to interact with an analytic server 110*a*, a panelist electronic device 130, and/or an user electronic device 120. The interpreter electronic device 140 may be any computing device comprising a processor and non-transitory machine-readable storage medium allowing the interpreter electronic device 140 to interact with the analytic server 110*a*, the panelist electronic device 130, and/or the user electronic device 120 through one or more networks 150. The examples of the computing device may include, but are not limited to, a desktop computer, a laptop, a personal digital assistant (PDA), a smartphone, a tablet computer and the like.

The interpreter electronic device 140 may be operated by an interpreter. In operation, the interpreter electronic device 140 may receive request from an analytic server 110*a* for translation of data (audio or video data) from one language into another. The analytic server 110*a* may receive the request for translation of data from a panelist electronic device 130 and/or an user electronic device 120. The request may include information associated with a source language in the data and one or more target languages for translation. In some cases, the request may only include information corresponding to one or more target languages for translation, and the interpreter electronic device 140 may process the data to determine the source language within the data. In some cases, there may be multiple source languages within the data.

In some cases, upon receiving a request from an analytic server 110*a* for translation of data from one language into another language, an interpreter electronic device 140 may execute an algorithm and/or a software program, which may activate a graphical user interface (GUI) provided by an analytic server 110*a* for an interpreter operating the interpreter electronic device 140 to select incoming source language (for example, a first language) of the data file and outgoing target language (for example, a second language) of the same data file. The interpreter electronic device 140 may receive the data in incoming source language (for example, a first language) from the analytic server 110*a*. The interpreter may then translate the data in the first language into the second language on the interpreter electronic device 140. The interpreter electronic device 140 may then transmit the translated data (in the second language) to the analytic server 110*a*. As a result, the interpreter electronic device 140 may be able to provide translation of the presentation data from an incoming language (for example, a first language) to an outgoing language (for example, a second language). When there are more interpreters selecting different incoming and outgoing languages, the users from all over the world with different language requests may be able to participate in the panel/conference with a help of interpreters (operating various interpreter electronic devices 140).

In some embodiments, one or more interpreter electronic device 140 may receive a request from an analytic server 110*a* for translation of data from multiple languages (for example, a first and a second language) into another language (for example, a third language). An interpreter electronic device 140 upon receiving the request from the analytic server 110*a* for translation of data from the multiple languages (for example, a first and a second language) into the another language (for example, a third language), the interpreter electronic device 140 may then execute an algorithm and/or a software program, which may activate a graphical user interface (GUI) provided by the analytic server 110*a* for an interpreter operating the interpreter electronic device 140 to select incoming source languages (for example, a first and a second language) of the data file and an outgoing target language (for example, a third language) of the same data file. The interpreter may then translate the data in the first and the second language into the third language on the interpreter electronic device 140. The interpreter electronic device 140 may then transmit the translated data (in the third language) to the analytic server 110*a*. In some cases, a first interpreter may translate the data in the first language into the third language on a first interpreter electronic device and a second interpreter may translate the data in the second language into the third language on a second interpreter electronic device. The first interpreter electronic device and the second interpreter electronic device may then transmit the translated data (in the third language) to the analytic server 110*a*. As a result, one or more interpreter electronic devices 140 may be able to provide translation of the presentation data from an incoming language (for example, a first and a second language) to an outgoing language (for example, a third language). When there are more interpreters selecting different incoming and outgoing languages, the users from all over the world with different language requests may be able to participate in the panel/conference with a help of interpreters (operating various interpreter electronic devices 140).

The analytic server 110a may be any computing device comprising a processor and other computing hardware and software components, configured to process requests received from user electronic device 120. The analytic server 110a may be logically and physically organized within the same or different devices or structures, and may be distributed across any number of physical structures and locations (e.g., cabinets, rooms, buildings, cities). The analytic server 110a may comprise, or may be in networked-communication with a user database 110b and an interpreter database 110c.

The analytic server 110a may provide entries for different panels on a graphical user interface (GUI) displayed on the user electronic device 120, when there are multiple events/panels happening at a same time. The user may choose a panel and request to participate in the panel using the user electronic device 120. In some embodiments, the user may choose a panel and request to participate in the panel using a language interpretation application on the user electronic device 120. The request of the user may be transmitted by the language interpretation application or the user electronic device 120 to the analytic server 110a. In some embodiments, the analytic server 110a may also generate a user interface on the user electronic device 120 that may include different languages. The user interface may provide an option to the user to select a certain language the user would like to use during the participation (e.g., listen to the panel audio signals and discuss with panelists in selected language). Upon the analytic server 110a receiving the request (including the selected language) from the user electronic device 120, the analytic server 110a may then execute one or more component software modules and algorithms to provide language interpretation service of the selected panel to the user in the requested/selected language. In order to provide the language interpretation service, the analytic server 110a may determine an interpreter operating an interpreter electronic device 140 based on the selected language by the user and source language of the panelists in the panel being participated by the user to do the translation services by converting the source language into the language selected by the user. In some embodiments, the analytic server 110a may determine an interpreter operating an interpreter electronic devices 140 based on the interpreter's chosen incoming language and outgoing language. For this purpose, the analytic server 110a may analyze records associated with each interpreter to determine each interpreter's choice of incoming language and outgoing language. When a given interpreter's (for example, a first interpreter) incoming language matches the panelist source language and outgoing language matches the user's requested target language, the analytic server 110a may select the first interpreter for translation activity, and transmit the data (such as audio and/or video data) received from/recorded on the panelist electronic device 130 to the interpreter electronic device 140 of the first interpreter over a network 150 as the panel discussion is going on in real-time. The first interpreter using the interpreter electronic devices 140 may then translate the received data from the incoming language to the outgoing language in real time on the interpreter electronic device 140. The analytic server 110a may receive the translated data in the outgoing language from the interpreter computer device 140 and transmit the translated data in the outgoing language to the user electronic device 120, so that the user may be able to listen to the translated data in in the requested language.

The analytic server 110a is communicatively coupled to a signaling server 160 to provide real-time communications (RTC) capabilities. The signaling server 160 can establish, control, and terminate a communication session between nodes (e.g., electronic devices). The signaling server 160 uses session control messages to monitor session control information, network data to identify nodes (e.g., IP address and port), and media data to determine media types for a presentation. During a communication session, nodes can exchange metadata through the signaling server 160 to coordinate the communication (e.g., audio and video).

A user database 110b and an interpreter database 110c may be any non-transitory machine-readable media configured to store data corresponding to user records and interpreter records. A user may be person participating in a live discussion and/or meeting, and speaking or listening to one or more languages. The user records may include each user's identifier, participated panels, language of preference, and other related data (e.g., user credentials and identification data). The user records maybe stored in user database 110b. An interpreter may be a person who interprets and/or translates speech from one language into another languages. The interpreter records may include each interpreter's identifier, interpreted panels, choice of incoming languages, choice of outgoing languages and other related data, such as topic preferences, language capability levels, and the like. The interpreter records maybe stored in interpreter database 110c. Based on analysis of records in the user database 110b and the interpreter database 110c, the analytic server 110a may be able to select the interpreters for different users more efficiently.

The user database 110b and the interpreter database 110c may be hosted on any server computer (such as the analytic server 110a). The user database 110b and the interpreter database 110c may be in communication with a processor, where the processor is capable of executing the various commands of the database management system. In some embodiments, the user database 110b and the interpreter database 110c may be part of the analytic server 110a; and, in some embodiments, the user database 110b and the interpreter database 110c may be a separate device that is in communication with the analytic server 110a. The user database 110b and the interpreter database 110c may be in communication to each other via a network 150. The user database 110b and the interpreter database 110c may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the analytic server 110a.

In some embodiments, a memory of the user database 110b and the interpreter database 110c may be a non-volatile storage device for storing data and instructions to be used by a processor of the analytic server 110a. The memory may be implemented with a magnetic disk drive, an optical disk drive, a solid state device, or an attachment to a network storage. The memory may include one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory.

In some embodiments, a memory of the user database 110b and the interpreter database 110c may be a temporary memory, such that a primary purpose of the memory is not long-term storage. The memory described as a volatile memory, meaning that the memory do not maintain stored contents when the analytic server 110a is turned off. Examples of the volatile memories may include dynamic random access memories (DRAM), static random access memories (SRAM), and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

The system 100 described herein operates in a cloud-computing environment where user electronic devices 120 are cloud-optimized, and transmit a request via a language interpretation application for translation of an audio data of a live broadcasting of any event to a cloud-based analytic server 110a. The user electronic device 120 data and application programs may be stored and executed on the cloud-based analytic server 110a accessed over a network cloud. In the cloud computing environment, a web browser corresponding to a language interpretation application on the user electronic device 120 may interface with an application program that is executed on the cloud-based analytic server 110a. Through the browser corresponding to the language interpretation application on the user electronic device 120, a user may generate a request for translation of an audio data of a live broadcasting of any event in any language, and transmit the request to the cloud-based analytic server 110a via the application program. In some embodiments, the system 100 described herein operate in a cloud computing environment where the user electronic device 120 may transmit to the cloud-based analytic server 110a a request for receiving translation of an audio data of a live broadcasting of any event in a given language. The data and application programs received from the cloud-based analytic server 110a to the user electronic device 120 may be stored locally in the user electronic device 120 and executed on local computing resources of the user electronic device 120.

Figure 2:
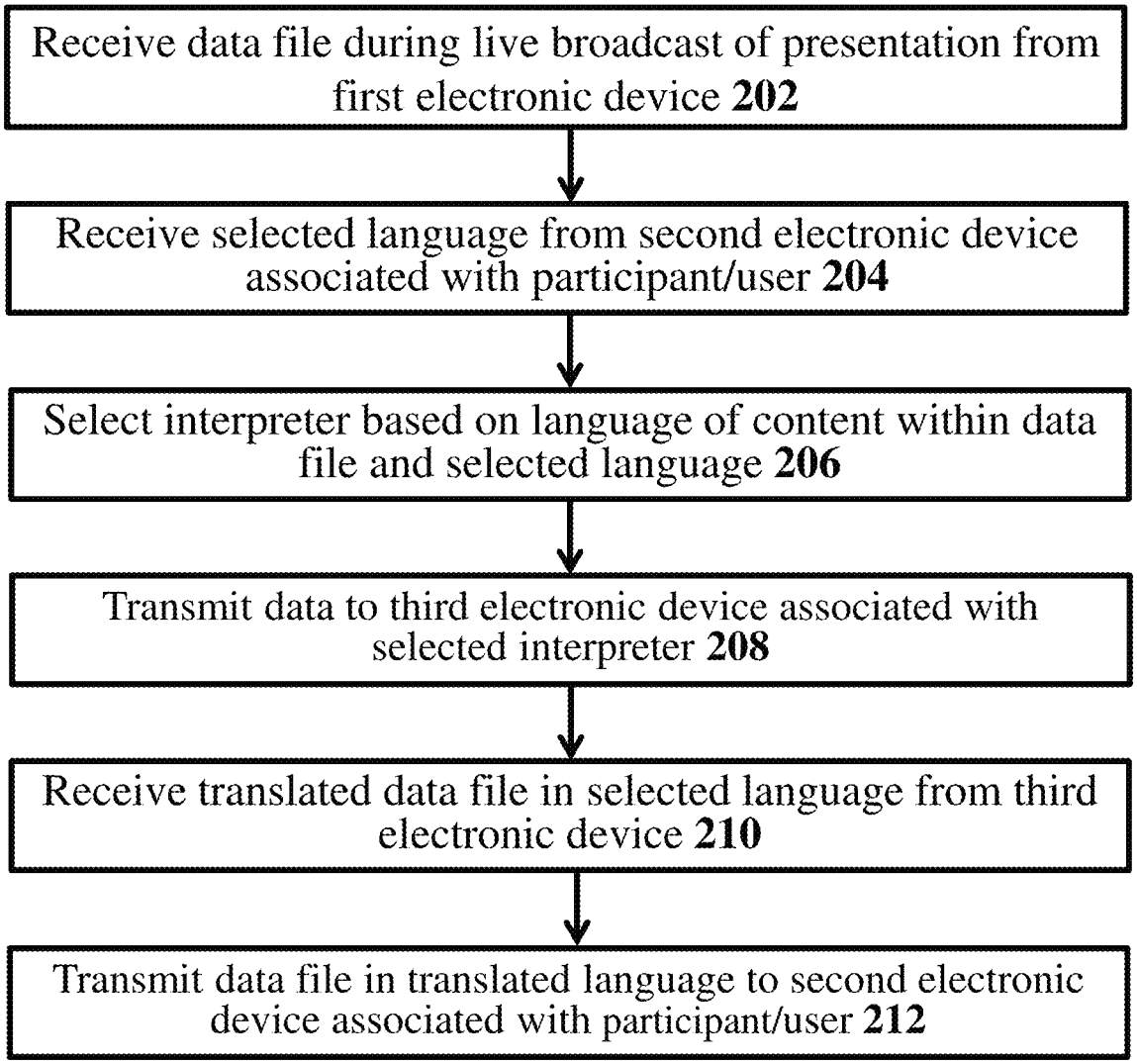
FIG. 2 shows execution of a method for language translation, according to an exemplary embodiment.

FIG. 2 shows execution steps of language translation during live broadcast of a presentation, according to an exemplary method 200. The exemplary method 200 shown in FIG. 2 comprises execution steps 202, 204, 206, 208, 210, and 212. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 200 of FIG. 2 is described as being executed by a single server computer in this exemplary embodiment. However, in some embodiments, steps may be executed by any number of computing devices operating in a distributed computing environment. In some cases, a computer executing one or more steps may be programmed to execute various other, unrelated features, where such computer does not need to be operating strictly as an analytic server described herein.

At step 202, an analytic server may receive a data file containing video and audio signals data from one or more first electronic devices such as one or more panelist electronic devices during a live broadcast of a presentation on an application (such as a live broadcasting software application) being executed on the panel electronic device. The broadcast refers to the presentation of a live media feed of an event to a plurality of users and/or viewers who may or may not be physically present at the event's occurrence. Any live event or recorded event that is transmitted over a network to those connected to the network can be considered a broadcast. The broadcast can be transmitted and received via radio, satellite, cellular network, other wireless device, cable, the internet, WAN, LAN, intranet, and the like.

In operation, a panelist electronic device may record a live presentation of one or more panelists in form of audio and/or video data. The panelist electronic device may then transmit the audio and/or video data to an analytic server. The audio data may be in the forms of WAV, MP3, WMA, AU, AA, AMR, RA, AWB, WV, and the like. During the live presentation, one or more panelists may speak. The live presentation may be seen and heard by viewers (users) on their respective devices (user electronic devices) via the application. On each slide of the presentation being displayed on the devices of the viewers, a video of a panelist speaking may also be provided.

In some cases, a panelist among the one or more panelists may be designated as a VIP panelist. The VIP panelist may initiate and manage the live presentation. The VIP panelist may also allow one or more panelists to join remotely. The VIP panelist may have an additional set of privileges that may include for example, an ability to control a request to speak of other panelists, upload files, edit files, edit presentation, manage a vote, among others. There may be multiple panels happening at the same time. Each panel may have a different VIP panelist. In some cases, a panel may have no VIP panelist. The analytic server may receive audio and/or video data from the multiple panels' presentations, and provide an entry for each panel in an user interface corresponding to the application. For example, the user interface may include a hyperlink for each panel. The recorded audio signals may be in one or more languages. Because the participants/users may not speak the audio signal source languages, the user may request interpretation services to participate in the panel.

At step 204, an analytic server may receive a request from a second electronic device such as a user electronic device that may include a selected panel and a selected language. A language interpreter application may be installed on the user electronic device, which may be user by a user to generate and transmit any requests. The language interpreter application may be associated with the live broadcasting software application. In some cases, the language interpreter application may include features associated with the live broadcasting software application. In some cases, the live broadcasting software application may include features associated with the language interpreter application. The user may select a panel to participate by clicking on the corresponding hyperlink on the user interface. In addition, the user interface may include a dropdown menu that may include different options for different languages. In an alternative to using a dropdown menu, the user interface may include a text-based box where the user may manually type the requested language, a plurality of radio buttons corresponding to languages that can be selected by the user, or other interface configuration that allows for a user selection. The user may select a requested language to participate in the panel, when the user does not speak the audio signal source language. For example, the audio signals may be in French.

The user may speak English, and request the audio signals to be translated to English. In another embodiment, the user may change the selected language during the presentation. For example, the user may speak Spanish too, and may request the audio signals to be translated to Spanish during the live streaming of the presentation.

At step 206, an analytic server may select an interpreter based on audio signal source language and user selected target language. The analytic server may request each interpreter to input incoming language and outgoing language, and save the information in a record of the interpreter in an interpreter database. Based on information within the records of the interpreters, the analytic server may select an interpreter whose incoming language matches the audio signal source language and outgoing language matches the user selected target language. Furthermore, the analytic server may consider other factors including, but not limited to, the topic preferences and language capability levels of interpreters when selecting the right interpreters. Different users may select different target languages. To server different users' needs, there may be multiple interpreters working at the same time to translate the audio signals in a source language to all of the languages the users have requested. Thus, people from all over the world who do not speak a common language may be able to participate in the same panel and communicate with each other. In some embodiments, when the user changes the selected language, the analytic server may assign a different interpreter to serve the user based on the new selected language.

At step 208, an analytic server may transmit the audio signals to a third electronic device such as the interpreter electronic device. The transmitted audio signals may be in the source language the panelist speaks. As the interpreter electronic device receives the audio signals, each interpreter may translate the source language to one outgoing language in real time. Thus, even though all interpreters may receive the audio signals in the same source language, the outgoing language may be different. Each interpreter may serve a group of users requesting the same target language.

At step 210, an analytic server may receive the translated audio signals in selected target language from the third electronic device such as the interpreter electronic device. For each specific user, there is one interpreter providing the translation of the presentation in the user requested language. The analytic server may continuously receive the translated audio signals from the interpreter electronic device as the live streaming of the panel presentation goes on. In some embodiments, the analytic server may connect the interpreters and the corresponding groups of users they serve. When the user changes the selected target language, the analytic server may connect a different interpreter to the user based on the new target language and receive the translated audio signals in the new target language. The analytic server may receive audio signals from different interpreters in different translated languages.

At step 212, an analytic server may transmit the audio signals in the translated language to the second electronic device such as the user electronic device. With the assistance of the interpreters, the user electronic device may receive audio signals of the presentation in a specific language the user requested. When the user changes the target language during the live streaming of the panel presentation, the analytic server may transmit the audio signals in the new target language to the user in real time. Therefore, no matter what languages the panelist speaks, the user may be able to participate in the panel instantly through the methods and systems described herein.

As discussed above, the participants/users may ask questions in their languages by issuing requests in the GUI displayed on the user electronic device. The GUI may be of a language interpreter application and/or a live broadcasting software application. The analytic server may receive such questions and request the interpreters to translate the questions into the language the panelists speak. The analytic server may transmit the translated audio signals to the panelist electronic device. Thus, the users and panelists may communicate with each other even though they may not speak a common language.

Figure 3:
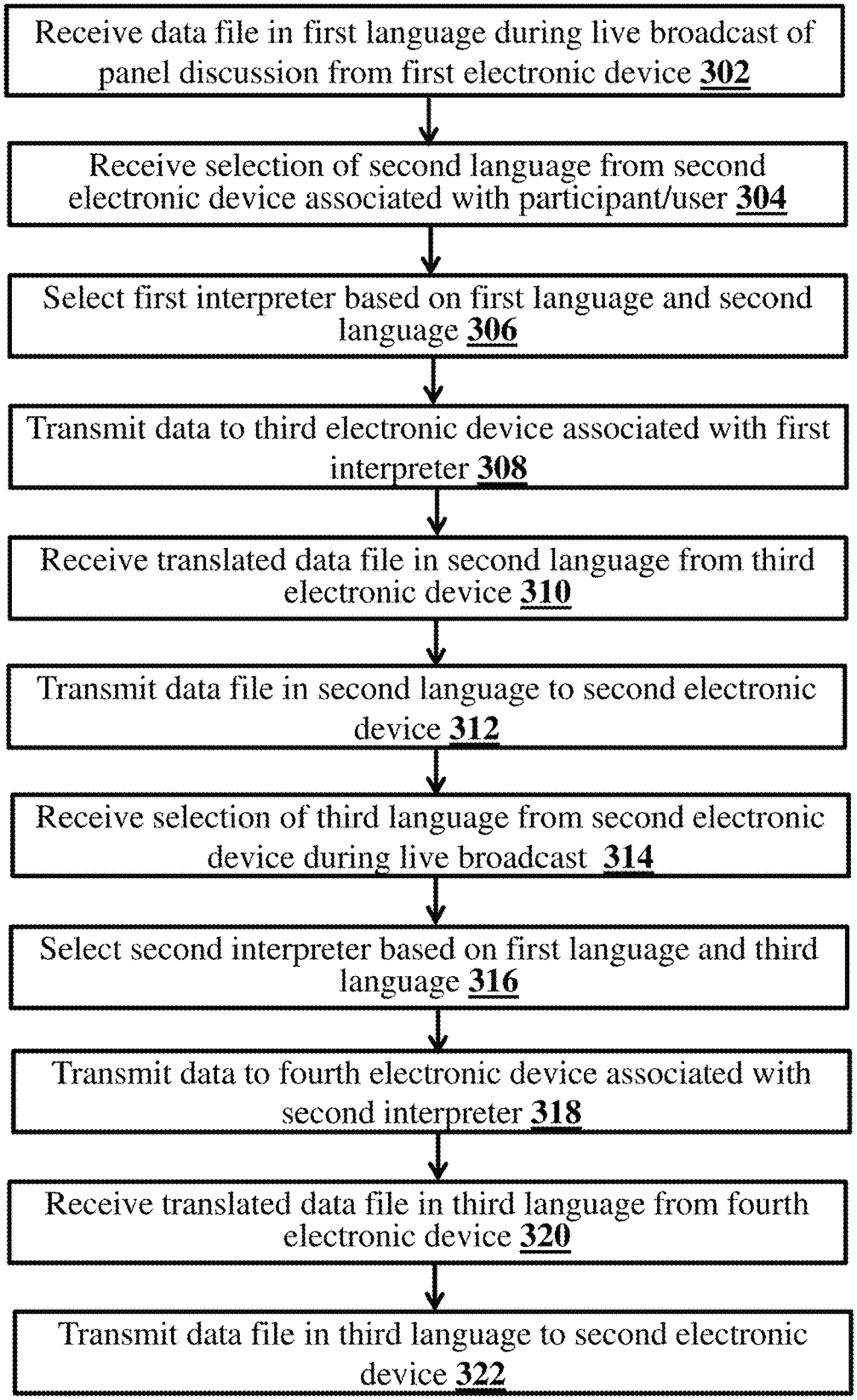
FIG. 3 shows execution of a method for language translation, according to an exemplary embodiment.

FIG. 3 shows execution steps of language translation during live broadcast of a panel discussion, according to an exemplary method 300. The exemplary method 300 shown in FIG. 3 comprises execution steps 302, 304, 306, 308, 310, 312, 314, 316, 318, 320, and 320. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 300 of FIG. 3 is described as being executed by a single server computer in this exemplary embodiment. However, in some embodiments, steps may be executed by any number of computing devices operating in a distributed computing environment. In some cases, a computer executing one or more steps may be programmed to execute various other, unrelated features, where such computer does not need to be operating strictly as an analytic server described herein.

At step 302, an analytic server may receive a data file containing video and audio data from a first electronic device such as a panelist electronic device during a live broadcast of panel discussion on an application being executed on the panel electronic device. The video and audio data within the data file may be in a first language. In operation, the panelist electronic device may record the live broadcast of discussion of the panelists, and send recorded data file to the analytic server. The data file may be in the formats such as WAV, MP3, WMA, AU, AA, AMR, RA, AWB, WV, or the like. There may be multiple panels happening at a same time. The analytic server may receive data files from the multiple panels' presentations, and provide an entry for each panel in an user interface of the application. For example, the user interface may include a hyperlink for each panel. Because some of the participants/users may not speak the first language, one or more users may request interpretation services to understand the discussion and/or participate in the panel discussion.

At step 304, an analytic server may receive a request from a second electronic device such as a user electronic device that may include a name of a selected panel for participant and a selected language (for example, a second language) for language interpretation/translation services. The user may select a panel on the application to participate by clicking on the corresponding hyperlink on the user interface. The participants of the selected panel may be having a discussion in a first language. The user interface may also include a dropdown menu that may include different options for different languages for selection by the user. The user may select a second language in which the content of the first language being discussed in the selected panel discussion has to be translated. In an alternative to using a dropdown menu, the user interface may include a text-based box where the user may manually type the requested language (for example, a second language), a plurality of radio buttons corresponding to languages that can be selected by the user, or other interface configuration that allows for a user selection of the second language. The user may select a requested language (for example, a second language) to participate in the panel, when the user does not speak the first language. For example, the first language may be in French. The user may speak English and request the data to be translated to the second language such as English.

At step 306, an analytic server may select an interpreter based on a first language (French language), which is a source language of a panel discussion and a second language (English language), which is selected by a user for translation activity. The analytic server may then analyze records of each interpreter in an interpreter database to find the interpreter who can translate the content of the first language into the second language. The record of each interpreter may include a name of input incoming language (source language) and output outgoing language (target language). Each interpreter may be able to provide translation services from source language to the target language. Based on the analysis of records of interpreters in the interpreter database, the analytic server may then select a first interpreter whose input incoming language matches the first language and the output outgoing language matches the second language. In other words, the first interpreter can translate the content of the first language into the second language.

In some embodiments, the analytic server may consider various factors including topic preferences and language capability levels of interpreters when selecting the right interpreters for translating the content of the first language into the second language. Different users operating different user electronic devices may select different target languages. To serve different users' needs, there may be multiple interpreters working at a same time to translate the data file in source language to all of the languages the users may request. Thus, people from all over the world who do not speak a common language may be able to participate in a same panel and communicate with each other.

At step 308, an analytic server may transmit data file to a third electronic device such as a first interpreter electronic device being operated by a first interpreter selected for translating content of data file in a first language into a second language. The transmitted data file may be in a first language. As the first interpreter electronic device receives the data file, the first interpreter may translate the content of data file from the first language to the second language in real time.

At step 310, an analytic server may receive translated data file containing content in a second language from a first interpreter electronic device. For the user, the first interpreter may continuously provide translation services in real-time as the panel discussion is going on. The analytic server may continuously receive the translated data file containing new content from the first interpreter electronic device as the panel discussion keep generating new content.

At step 312, an analytic server may transmit translated data file containing content in a second language to a user electronic device. The user of the user electronic device may then be able to understand the content and accordingly participate in the panel discussion.

At step 314, during broadcasting of same panel discussion in a live panel discussion, an analytic server may receive a request from a user electronic device that may include a selection of a new language (for example, a third language) for language interpretation/translation services. The participants of the panel may still be having a discussion in a first language. The user may select a third language in which the content of the first language being discussed in the selected panel discussion has to be translated. The user may select a requested language (for example, a third language) to participate in the panel, when the user does not speak the first language. For example, the first language may be in French. The user may speak Spanish and request the data to be translated to the third language such as Spanish.

At step 316, an analytic server may select an interpreter based on a first language (French language), which is a source language of a panel discussion and a third language (Spanish language), which is selected by a user for translation activity. The analytic server may then analyze records of each interpreter in an interpreter database to find the interpreter who can translate the content of the first language into the third language. The record of each interpreter may include a name of input incoming language (source language) and output outgoing language (target language). Each interpreter may be able to provide translation services from source language to the target language. Based on the analysis of records of interpreters in the interpreter database, the analytic server may then select a second interpreter whose input incoming language matches the first language and the output outgoing language matches the third language. In other words, the second interpreter can translate the content of the first language into the third language.

At step 318, an analytic server may transmit data file to a fourth electronic device such as a second interpreter electronic device being operated by a second interpreter selected for translating content of data file in a first language into a third language. The transmitted data file may be in a first language. As the second interpreter electronic device receives the data file, the second interpreter may translate the content of data file from the first language to the third language in real time.

At step 320, an analytic server may receive translated data file containing content in a third language from a second interpreter electronic device. For the user, the second interpreter may continuously provide translation services in real-time as the panel discussion is going on. The analytic server may continuously receive the translated data file containing new content from the second interpreter electronic device as the panel discussion keep generating new content.

At step 312, an analytic server may transmit translated data file containing content in a third language to a user electronic device. The user of the user electronic device may then be able to understand the content and accordingly participate in the panel discussion. It is to be noted that the analytic server may be able to switch between the first interpreter electronic device and the second interpreter electronic device in response to the request of the user to provide translation services in the second and third language without the user having to close the application on which the user is viewing the panel discussion. For example, for first one hour of panel discussion, the user may be receiving translated data in English language as per the request, and then for subsequent one hour of the same panel discussion, the user may be receiving translated data in Spanish language as per the new request of the user transmitted to the analytic server during the panel discussion.

Figure 4:
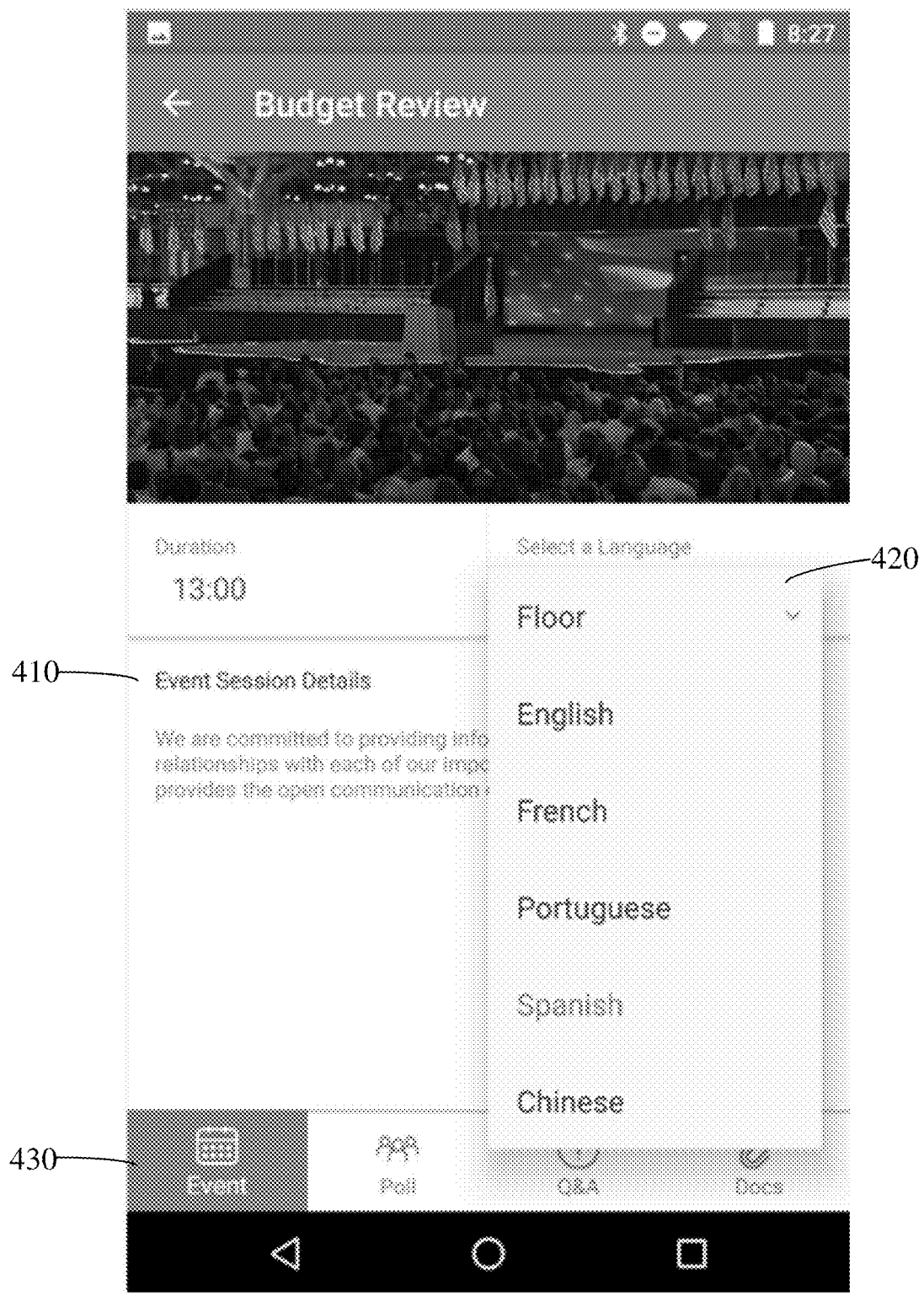
FIG. 4 illustrates an example of a graphical user interface of selecting and/or changing a target language by a user, according to an exemplary embodiment.

FIG. 4 illustrates an example of a graphical user interface 400 of selecting and/or changing a target language by a user. The graphical user interface 400 is displayed on a user mobile electronic device (e.g., a smartphone). The user mobile electronic device may include a processor/microcontroller and/or any other electronic component that performs one or more operations according to one or more programming instructions. The user mobile electronic device may be capable of communicating with a server through a communications network using wired or wireless communication capabilities.

A language interpreter application may be installed on a user mobile electronic device, which may facilitate language translation activity for content corresponding to a live broadcasting of data. In some embodiments, the language interpreter application may be a live broadcasting software application installed on the user mobile electronic device. The live broadcasting software application may facilitate live broadcasting activity of presentations etc. In some cases, both the language interpreter application and the live broadcasting software application may facilitate both language translation activity and live broadcasting activity.

In some embodiments, a language interpreter application may be configured to display on a website of a language translation company. For example, the language translation company may generate the language interpreter application as a widget configured to communicate with different users and the widget may be displayed on the website of the language translation company. A computing device such as a user mobile electronic device or any other computer may have access to one or more databases or pre-stored web-based interfaces, such as webpages, comprising a number of preconfigured sub-interfaces, or containers, that are dynamically populated (e.g., widget box). For example, language interpreter application webpages may contain code, such as HTML or PHP, presenting a website of any number of webpages having a common look-and-feel. One or more outputs or results may display webpages that may contain additional code for containers, where the container code displays the language interpreter application widget. A user may access a webpage and interact with the computing device via the language interpreter application. In some implementations, the computing device may be configured to require user authentication based upon a set of user authorization credentials (e.g., username, password, biometrics, cryptographic certificate) to provide access to the language interpreter application on the computing device. For example, the computing device may access a database configured to store the user credentials, which a webserver may be configured to reference in order to determine whether a set of entered credentials purportedly authenticating the user match an appropriate set of credentials that identify and authenticate the user. Similarly, in some implementations, the webserver may generate and serve applications/webpages associated to the language interpreter application to the computing device based upon a user membership account. In some embodiments, the webserver may generate and serve applications/webpages associated to the language interpreter application to the computing device based upon the user membership. In such implementations, the user membership may be defined by data fields in the user records stored in the database, and authentication of the user and the user membership may be conducted by the webserver by executing an access directory protocol.

During operation, a user may access a webpage shown in a graphical user interface 400 by any common access method, e.g., keying in a URL, selecting from search results, etc., and submit user credentials to access the language interpreter application. The graphical user interface 400 may display event session details 410 of a selected panel and/or event by a user, a dropdown menu 420 providing different options of languages for a user to select, and other components such as time duration, poll, Q&A and Docs. In operation, a user may first select a tab corresponding to an "event" 430 on the graphical user interface 400 to select different panels and/or events. Then, the user may user the dropdown menu 420 to select a language or change to a different language during a live broadcasting of the panel presentation selected by the user. A floor language option in the dropdown menu 420 may be a source language of the panelist of the panel presentation selected by the user. In other words, when the user selects the option "floor" in the dropdown menu 420, the user may listen to the audio data of the panel presentation in the source language (for example, Russian); and there may be no need for interpretation. When the user selects any other language such as Spanish in the dropdown menu 420, a target language may then become Spanish. The analytic server may assign an interpreter to translate the audio data in Russian language into the selected language (e.g., Spanish).

Figure 5:
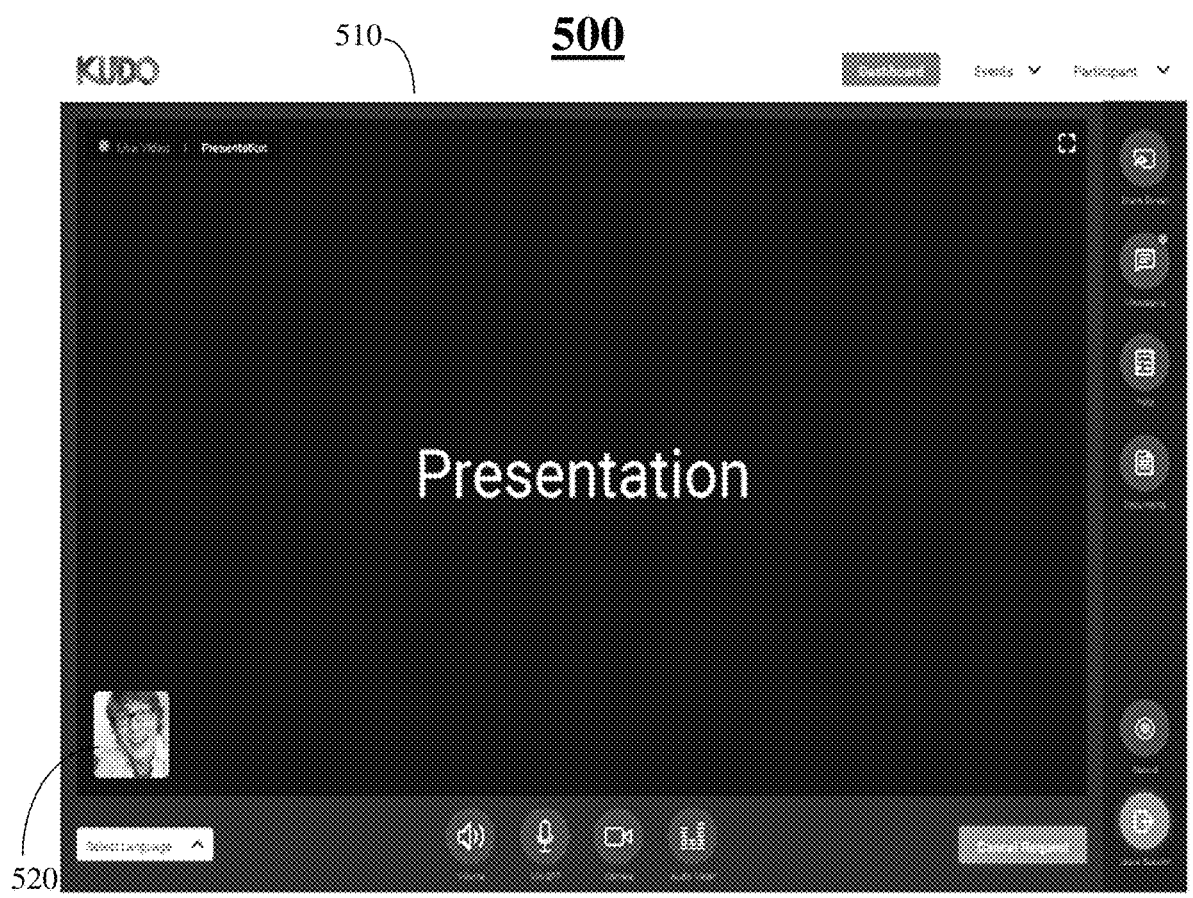
FIG. 5 illustrates a graphical user interface showing a picture in picture feature, according to an exemplary embodiment.

FIG. 5 illustrates an example of a graphical user interface 500 showing a picture in picture feature. The graphical user interface 500 is displayed on a user mobile electronic device (e.g., a smartphone). In some embodiments, the graphical user interface 500 may be of a language interpreter application installed on the user mobile electronic device. The language interpreter application may facilitate language translation activity for content within a live broadcasting of data. In some embodiments, the graphical user interface 500 may be of a live broadcasting software application installed on the user mobile electronic device. The live broadcasting software application may facilitate live broadcasting activity. In some cases, both the language interpreter application and the live broadcasting software application may facilitate both language translation activity and live broadcasting activity.

The graphical user interface 500 display a presentation 510 and a video 520 at a same time, thus a user viewing the graphical user interface 500 is able to see the presentation 210 and watch the video 520 (along with hearing audio signals of speech of the panelist). The video 520 depicts a face of a panelist who is speaking at that time. In some embodiments, the video 520 may depict images of all panelists. In some embodiments, the video 520 may depict images of all panelists, but the panelist who is speaking may be highlighted within the video 520.

Figure 6:
FIG. 6 illustrates a graphical user interface showing a VIP panelist feature, according to an exemplary embodiment.

FIG. 6 illustrates an example of a graphical user interface 600 showing a VIP panelist feature. The graphical user interface 600 is displayed on a user mobile electronic device (e.g., a smartphone). In some embodiments, the graphical user interface 600 may be of a language interpreter application installed on the user mobile electronic device. The language interpreter application may facilitate language translation activity for content within a live broadcasting of data. In some embodiments, the graphical user interface 600 may be of a live broadcasting software application installed on the user mobile electronic device. The live broadcasting software application may facilitate live broadcasting activity. In some cases, both the language interpreter application and the live broadcasting software application may facilitate both language translation activity and live broadcasting activity.

The graphical user interface 600 may display a VIP panelist 610 and a list of participants 620 requesting to join a panel discussion. The VIP panelist 610 may have authority to accept or reject a request of each participant from a list of participants 620 for joining a panel discussion. The VIP panelist 610 may further control speech of each participant in a panel discussion. The VIP panelist 610 may further manage vote of each participant in a panel discussion. The VIP panelist 610 may further have an authority to approve or disapprove uploading and/or downloading of files by each participant.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   receiving, by a server, floor audio signal data associated with a live video presentation from a first electronic device associated with a plurality of panelists who deliver content corresponding to the floor audio signal data in a first source language and a second source language;
   receiving, by the server, a request from a second electronic device associated with a user, wherein the request comprises a first target language selected by the user through a first graphical user interface, and wherein the live video presentation is presented on the first graphical user interface of the second electronic device;
   selecting, by the server, a first interpreter based on the first source language and the first target language, wherein the server displays a second graphical user interface on a third electronic device associated with the first interpreter requesting the first interpreter to input an incoming language and an outgoing language, and wherein the server selects the first interpreter in response to the incoming language matching the first source language and the outgoing language matching the first target language;
   transmitting, by the server, the floor audio signal data to the third electronic device, wherein the first interpreter translates the floor audio signal data from the first source language to the first target language on the third electronic device in real time to generate second audio signal data;

receiving, by the server, the second audio signal data in the first target language from the third electronic device; and in response to the request from the second electronic device, transmitting, by the server, the second audio signal data in the first target language and the second source language to the second electronic device associated with the user instead of transmitting the floor audio signal data.

2. The method of claim 1, wherein the server, the first electronic device, the second electronic device, and the third electronic device are connected to each other over one or more networks.

3. The method of claim 1, further comprising receiving, by the server, audio signal data of one or more questions from the second electronic device in the first target language.

4. The method of claim 3, further comprising transmitting, by the server, the audio signal data of the one or more questions to the third electronic device, wherein the interpreter translates the audio signal data of the one or more questions from the first target language to the first source language.

5. The method of claim 4, further comprising receiving, by the server, translated audio signal data of the one or more questions from the third electronic device in the first source language.

6. The method of claim 5, further comprising transmitting, by the server, the translated audio signal data of the one or more questions to the first electronic device.

7. The method of claim 1, wherein the first graphical user interface displayed on the second electronic device comprises a dropdown menu providing an option for selection of a language from a plurality of languages.

8. The method of claim 1, wherein the user selects the target language by typing a name of the first target language in a text-based user interface displayed on the second electronic device.

9. The method of claim 1, wherein the audio signal data is in a format selected from a group consisting of WAV, MP3, WMA, AU, AA, AMR, RA, AWB, and WV.

10. A system comprising:
a first electronic device being operated by a plurality of panelists;
a second electronic device being operated by a user; and
a server connected to the first electronic device and the second electronic device via one or more networks;
wherein the server is configured to:
receive floor audio signal data associated with a live video presentation from the first electronic device, wherein a language of content corresponding to the floor audio signal data is in a first source language and a second source language;
receive a request from the second electronic device, wherein the request comprises a first target language selected by the user through a first graphical user interface, and wherein the live video presentation is presented on the first graphical user interface of the second electronic device;
select a first interpreter based on the first source language and the target language, wherein the server displays a second graphical user interface on a third electronic device associated with the first interpreter requesting the first interpreter to input an incoming language and an outgoing language, and wherein the server selects the first interpreter in response to the incoming language matching the first source language and the outgoing language matching the first target language;
transmit the floor audio signal data to the third electronic device, wherein the first interpreter translates the floor audio signal data from the first source language to the first target language on the third electronic device in real time to generate second audio signal data;
receive the second audio signal data in the first target language from the third electronic device; and
in response to the request from the second electronic device, transmit the second audio signal data in the first target language and the second source language to the second electronic device associated with the user instead of transmitting the floor audio signal data.

11. The system of claim 10, wherein the server, the first electronic device, the second electronic device, and the third electronic device are connected to each other over the one or more networks.

12. The system of claim 10, wherein the server is further configured to receive audio signal data of one or more questions from the second electronic device in the first target language.

13. The system of claim 12, wherein the server is further configured to transmit the audio signal data of the one or more questions to the third electronic device, wherein the interpreter translates the audio signal data of the one or more questions from the first target language to the first source language.

14. The system of claim 13, wherein the server is further configured to receive translated audio signal data of the one or more questions from the third electronic device in the first source language.

15. The system of claim 14, wherein the server is further configured to transmit the translated audio signal data of the one or more questions to the first electronic device.

16. The system of claim 10, wherein the first graphical user interface displayed on the second electronic device comprises a dropdown menu providing an option for selection of a language from a plurality of languages.

17. The system of claim 10, wherein the user selects the target language by typing a name of the first target language in a text-based user interface displayed on the second electronic device.

18. The system of claim 10, wherein the audio signals data is in a format selected from a group consisting of WAV, MP3, WMA, AU, AA, AMR, RA, AWB, and WV.

* * * * *